US009332589B2

(12) United States Patent
Belghoul

(10) Patent No.: US 9,332,589 B2
(45) Date of Patent: *May 3, 2016

(54) MOBILE COMMUNICATION DEVICE WITH MULTIPLE WIRELESS TRANSCEIVERS AND METHODS FOR USE THEREWITH

(71) Applicant: BROADCOM CORPORATION, Irvine, CA (US)

(72) Inventor: Farouk Belghoul, Campbell, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/814,896

(22) Filed: Jul. 31, 2015

(65) Prior Publication Data

US 2015/0341982 A1    Nov. 26, 2015

Related U.S. Application Data

(63) Continuation of application No. 13/916,088, filed on Jun. 12, 2013, now Pat. No. 9,131,531.

(60) Provisional application No. 61/831,985, filed on Jun. 6, 2013.

(51) Int. Cl.
*H04W 36/00* (2009.01)
*H04W 88/06* (2009.01)
*H04B 7/04* (2006.01)
*H04W 48/16* (2009.01)

(52) U.S. Cl.
CPC .............. *H04W 88/06* (2013.01); *H04B 7/04* (2013.01); *H04W 36/0022* (2013.01); *H04W 48/16* (2013.01)

(58) Field of Classification Search
CPC ... H04W 36/08; H04W 84/045; H04W 88/06; H04W 84/12; H04W 40/36
USPC ........................................ 455/444, 443, 439
See application file for complete search history.

(56) References Cited

U.S. PATENT DOCUMENTS

| | | | | |
|---|---|---|---|---|
| 2011/0110349 A1* | 5/2011 | Grandhi | ................ | H04W 28/18 370/338 |
| 2012/0106516 A1* | 5/2012 | Jung | ..................... | H04W 48/08 370/331 |
| 2013/0288668 A1* | 10/2013 | Pragada | ................ | H04W 12/06 455/426.1 |

* cited by examiner

*Primary Examiner* — Tu X Nguyen
(74) *Attorney, Agent, or Firm* — Garlick & Markison; Bruce E. Stuckman

(57) ABSTRACT

A first wireless transceiver communicates pre-association data via a first wireless network, the pre-association data relating to a second wireless network, wherein the first wireless network supports communication via a first wireless protocol and wherein the second wireless network supports communication via a second wireless protocol that is different from the first wireless protocol. A second wireless transceiver communicates the pre-association data with the first wireless transceiver via a transceiver interface and processes the pre-association data to support an association by the second wireless transceiver with the second wireless network.

20 Claims, 10 Drawing Sheets

MOBILE COMMUNICATION DEVICE WITH MULTIPLE WIRELESS TRANSCEIVERS AND METHODS FOR USE THEREWITH

CROSS REFERENCE TO RELATED PATENTS/PATENT APPLICATIONS

The present U.S. Utility Patent Application claims priority pursuant to 35 U.S.C. §120 as a continuation of U.S. Utility application Ser. No. 13/916,088, entitled "MOBILE COMMUNICATION DEVICE WITH MULTIPLE WIRELESS TRANSCEIVERS AND METHODS FOR USE THEREWITH", filed Jun. 12, 2013, which claims priority pursuant to 35 U.S.C. §119(e) to U.S. Provisional Application No. 61/831,985, entitled "MOBILE COMMUNICATION DEVICE WITH MULTIPLE WIRELESS TRANSCEIVERS AND METHODS FOR USE THEREWITH", filed Jun. 6, 2013, both of which are hereby incorporated herein by reference in their entirety and made part of the present U.S. Utility Patent Application for all purposes.

BACKGROUND

1. Technical Field

The various embodiments generally relate to communication systems; and, more particularly, relate to wireless communications via devices capable of communicating with two or more networks via differing protocols.

2. Description of Related Art

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

DETAILED DESCRIPTION

Figure 1:
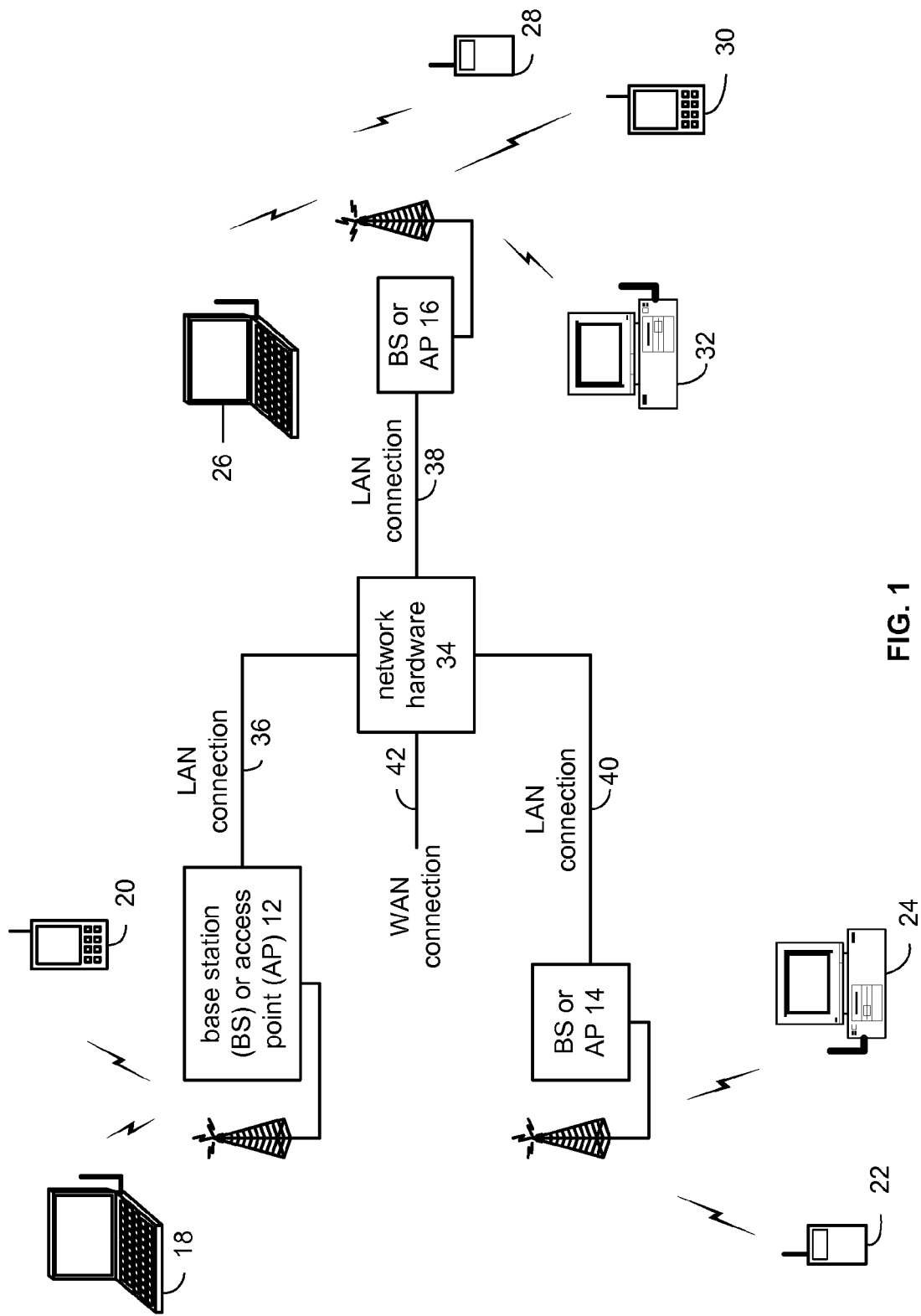
FIG. 1 is a diagram illustrating an embodiment of a wireless communication system.

FIG. 1 is a diagram illustrating an embodiment of a wireless communication system. In particular, such a wireless communication system includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of embodiments of such wireless communication devices, including several optional functions and features are described in greater detail with reference to FIGS. 2 and 3.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) 3GPP (third generation partnership project), LTE (long term evolution), UMTS (Universal Mobile Telecommunications System) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various embodiments as presented herein to enhance performance, reduce costs, reduce size, and/or enhance broadband applications.

In various embodiments, the wireless communication devices 18-32 include a plurality of wireless transceivers for communication with at least two different wireless networks operating in accordance with at least different wireless communication protocols. Pre-association data received via one of the wireless transceiver from one of the wireless networks is shared with a second one of the wireless transceivers. The pre-association data is processed via the second wireless transceiver to support an association by a second wireless transceiver with a second one of the wireless networks.

Further details including several optional functions and features spanning multiple embodiments are presented in conjunction with FIGS. 2-6 that follow.

Figure 2:
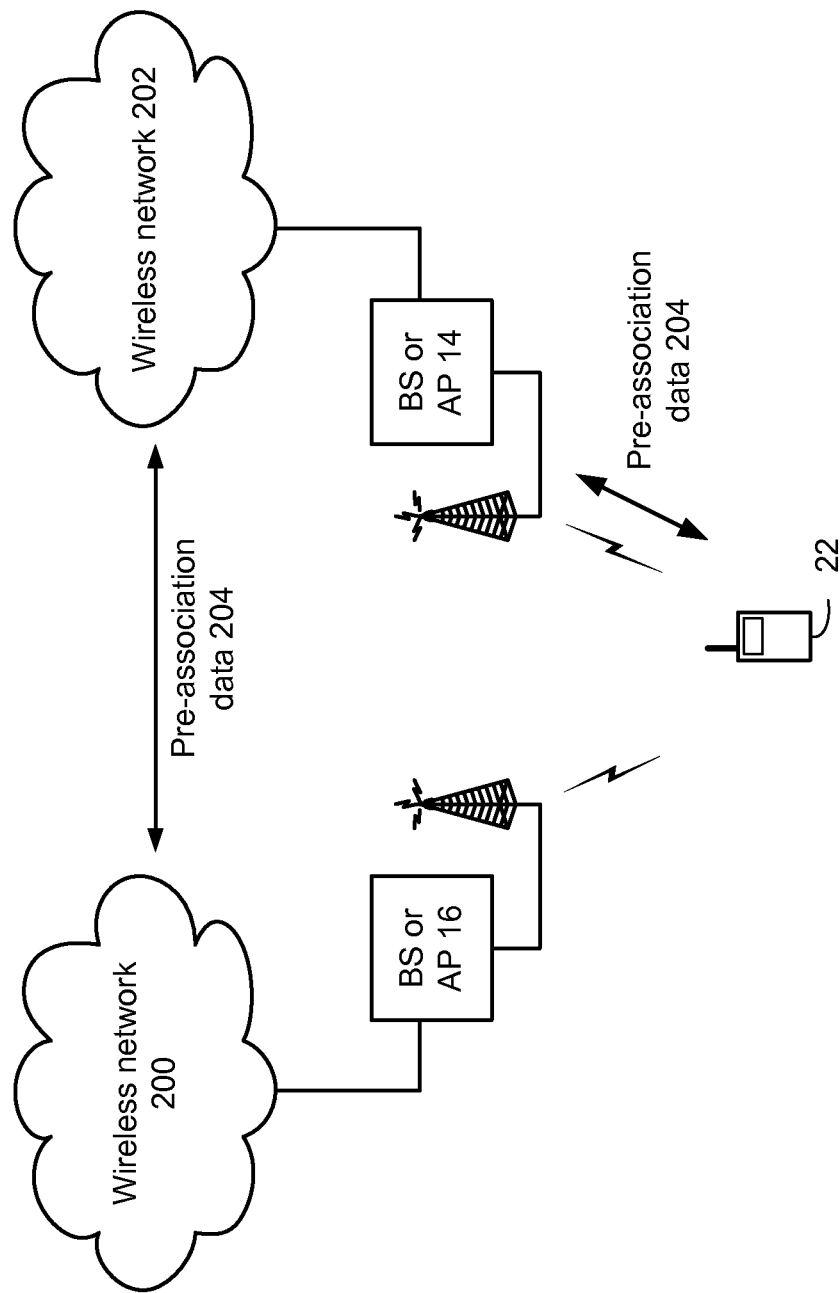
FIG. 2 is a further diagram illustrating an embodiment of a wireless communication system.

FIG. 2 is a further diagram illustrating an embodiment of a wireless communication system. As presented, pre-association data 204 is shared between a wireless network 200 and a wireless network 202. The wireless communication device 22 includes a plurality of wireless transceivers for communication with the wireless networks 200 and 202 via BS or AP (14 and 16) in accordance with at least two different wireless communication protocols. Pre-association data 204 received via one of the wireless transceivers from wireless network 202 is shared with a second one of the wireless transceivers. The pre-association data 204 is processed via a second wireless transceiver to support an association by the second wireless transceiver with the wireless network 200.

The operation of the wireless communication device 22 in conjunction with the wireless networks 200 and 202 is presented in conjunction with the examples that follow. In particular, consider the case where the wireless communication device is capable of communicating with both a wireless network 200 that is a local area network such as a 802.11u or 802.11uc compliant network or other network and a wireless network 202 that is a voice and data network, such as a 3GPP compliant network or other cellular or voice and data network.

WLAN/3GPP Radio interworking and integration is currently supported by 3GPP specifications at the core network level, including both seamless and non-seamless mobility to WLAN. For the Release 12, 3GPP is performing the standardization of LTE/UMTS RAN (radio access network) level enhancements for WLAN/3GPP Interworking via SID (study in detail) RP-122038. This targets the interworking between operators of a 3GPP core network and operators of WLAN access networks and hotspots. This interworking attempts to address the following issues:
 1. Operator deployed WLAN networks are often underutilized
 2. User experience is suboptimal when UE connects to an overloaded WLAN network
 3. Unnecessary WLAN scanning may drain UE battery resources
 4. Allow operators to offload partially or completely LTE/UMTS traffic to their WLAN access points.

These solutions attempt to enhance operator control for WLAN interworking, and enable WLAN to be included in the operator's cellular Radio Resource Management, and allow operators to have a better handling of WLAN interface through a 3GPP LTE/UMTS modem. These solutions also attempt to provide enhancements to access network mobility and selection which take into account information such as radio link quality per UE (user equipment), backhaul quality, load, etc. for both cellular and WLAN access.

In accordance with these examples, IEEE 802.11u GAS (Generic Advertisement Service) is a Layer 2 transport mechanism which allows advertisements between a mobile device and a server in the network prior to authentication. The access point is responsible for relaying mobile device's queries to a server in the carrier's network and for delivering the server's response back to the device. This protocol uses GAS as a transport to discover a range of metadata from the access point. A traditional IEEE 802.11u device executes the following steps in establishing connectivity:

1. The device scans for hotspots available.
 2. The device and the network GAS provide for Layer 2 transport of advertisement frames between the device and a server in the network prior to the authentication phase.
 3. ANQP is used to discover different features and available services of the network.
 4. The device proceeds to the authentication process.

In an embodiment, the pre-association data 204 can be formatted in accordance with a query and response protocol, such as the IEEE 802.11u ANQP (Access Network Query Protocol) discussed above. In operation, the mobile device 22, unlike traditional systems, exchanges ANQP data via the 3GPP network and shares this ANQP data between 802.11x and 3GPP transceivers in order to facilitate the association of the 802.11x transceiver with the 802.11u or 802.11uc network.

Figure 3:
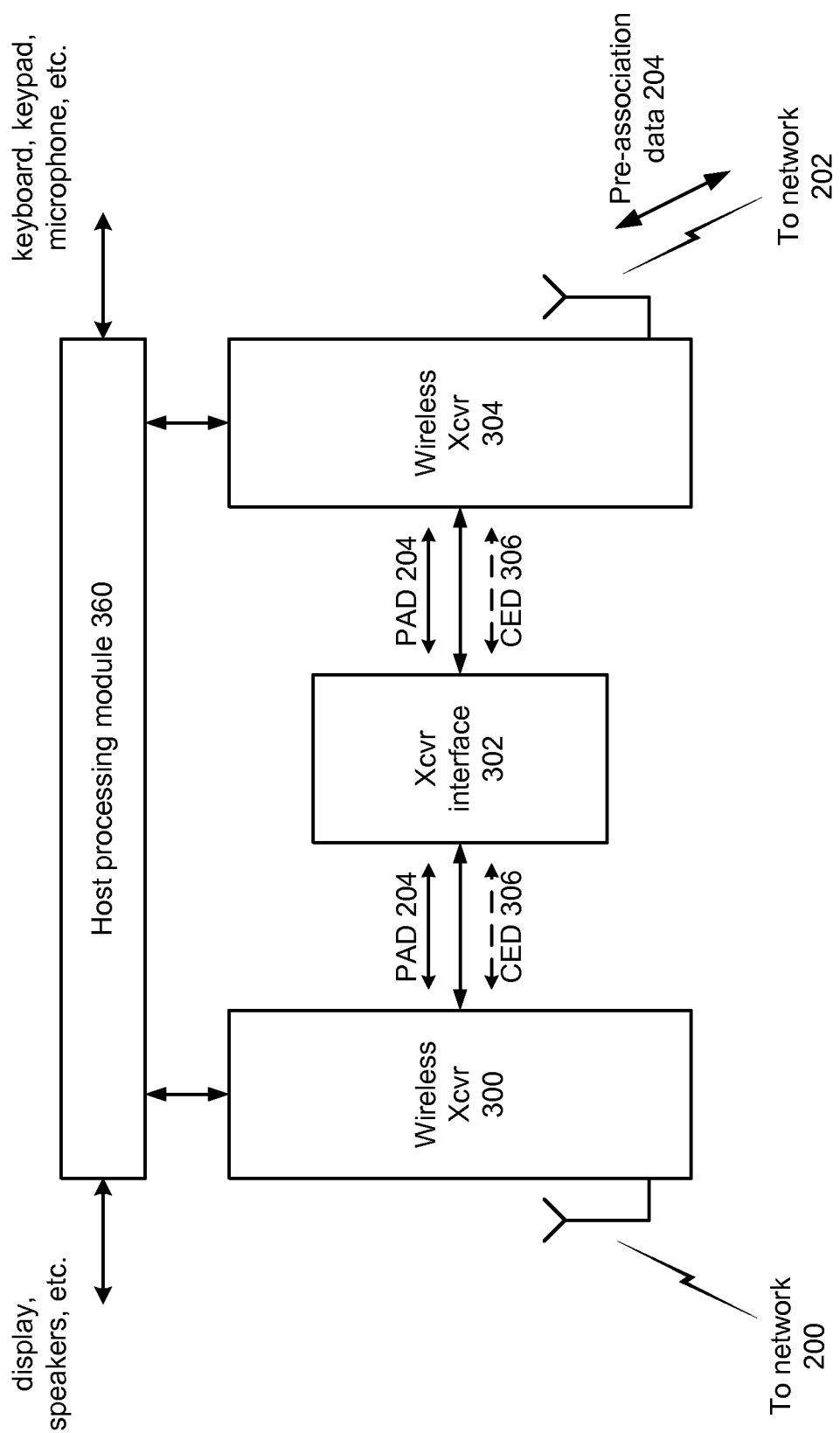
FIG. 3 is a diagram illustrating an embodiment of components of a wireless communication device.

FIG. 3 is a diagram illustrating an embodiment of components of a wireless communication device. A mobile communication device, such as devices 18-32, includes a plurality of wireless transceivers 300 and 304 that operate in conjunction with a host processing module 360. The wireless transceiver 300 communicates with a wireless network 200 and the wireless transceiver 304 communicates with a wireless network 202. The wireless network 200 supports communication via a first wireless protocol and the wireless network 202 supports communication via a second wireless protocol that is different from the first wireless protocol.

The wireless transceiver 304 communicates pre-association data 204 via the wireless network 202. The pre-association data 204 relates to the wireless network 200. The wireless transceiver 300 communicates the pre-association data with the wireless transceiver 304 via a transceiver interface 302. This communication can include both queries and responses by either the wireless transceiver 300 or the wireless network 200 that are carried via the wireless transceiver 304 and the wireless network 202. The wireless transceiver 300 processes the pre-association data received from the network 200 in this fashion to support an association by the wireless transceiver 300 with the wireless network 200.

In one example of operation, the two wireless transceivers support communication via a plurality of protocols. For example, wireless transceiver 300 or 304 may be compatible with IEEE 802.11(a), IEEE 802.11(b), IEEE 802.11(g), IEEE 802.11(n), 802.11u or 802.11uc as well as in accordance with various embodiments. Further, while a single antenna is shown schematically, the wireless transceivers 300 and/or 304 may each include multiple antennas and may support MIMO (multi-input multi-output) dimensions to 4x4 and greater. In addition or in the alternative, wireless transceiver 300 or 304 may be compatible with advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) LTE, UMTS and like-type systems, Bluetooth, ZigBee, and NFC (near field communications) and/or any other type of radio frequency based network protocol and/or variations thereof.

In addition to supporting the transfer of pre-association data 204, the transceiver interface 302 can be implemented via a general coexistence interface that is configured in different modes to support the transfer of different combinations of co-existence data 306 to avoid interference between the wireless transceivers 300 and 304 and their respective communications with wireless networks 200 and 202. In this fashion, GSM, LTE, 802.11x, and Bluetooth transceivers and/or a GPS (global positioning system) receiver that may utilize a common frequency spectrum can share coexistence data to reduce or avoid interference. In addition or in the alternative, the transceiver interface can include a bus structure, serial interface, parallel interface or other data interface.

Various embodiments apply to wireless radiotelephony equipment with multiple co-located radio modules ranging from LTE, WLAN, and Bluetooth to GPS. Consider an example where wireless transceiver 300 and wireless network 200 operate in accordance with 802.11u or 802.11uc and wireless transceiver 304 and wireless network 202 operate in accordance with 3GPP via UMTS or LTE modem.

As discussed in conjunction with FIG. 2, LTE and UMTS Release 12 support 3GPP/WLAN interworking via dedicated RAN mechanisms. Wireless networks 200 and 202 share pre-association data 204 via such interworking. In one example, interworking between WLAN APs in network 200 and eNode Bs in wireless network 202 allow the acquisition of information by the eNode Bs about the APs in their vicinity. This also includes the information provided through interaction of wireless network 202 with wireless network 200 via a WLAN ANQP Server or other network component.

In this configuration, the wireless transceiver 304 receives and optionally transmits 802.11u or 802.11uc pre-association data 204 over LTE or UMTS dedicated signaling on behalf of the wireless transceiver 300. In particular, the wireless transceiver 304 can provide this functionality via a query/response 3GPP RAN mechanism. The pre-association data 204 shared in this fashion is communicated internally to the wireless transceiver 300 via the transceiver interface 302. This provides the following advantages:

1. Allows the 802.11u or 802.11uc transceiver to use the 3GPP modem to retrieve ANQP information without scanning and connecting to any access points—even without powering on the radio portion of the transceiver.
2. Allows an 802.11x transceiver (WLAN pre 802.11u or other 802.11x) to use ANQP information even not supported natively or not supporting 802.11u or 802.11uc.
3. Reduces the overall latency of the connection process to wireless network 200.
4. Reduces the power consumption by simplifying the connection to the wireless network 200, and making the AP selection with the radio of wireless transceiver 300 offline.
5. Avoids use of the host processing module to exchange the ANQP information between the wireless transceiver 300 and wireless transceiver 304.

Examples of pre-association data 204 in various ANQP embodiments are presented in the table below.

| Information | source | Length (bytes) | Destination | Description |
|---|---|---|---|---|
| Venue Name | LTE/UMTS modem | 6-65540 | WLAN xcvr | Zero or more venue names associated with the BSS |
| Emergency Call Number | LTE/UMTS modem | 4-65540 | WLAN xcvr | List of emergency phone numbers |
| Network Authentication Type | LTE/UMTS modem | 4-65540 | WLAN xcvr | List of network authentication types |
| Roaming Consortium List | LTE/UMTS modem | 4-65540 | WLAN xcvr | Consortium and/or SSPs networks accessible via AP |
| IP Address Type | LTE/UMTS modem | 5 | WLAN xcvr | IP address version and type to be allocated to the UE |
| NAI Realm List | LTE/UMTS modem | 6-65540 | WLAN xcvr | NAI realms corresponding to SSPs or other entities whose networks or services are accessible via this AP |
| 3GPP Cellular Network | LTE/UMTS modem | 4-65540 | WLAN xcvr | PLMN list of 3GPP networks accessible through AP |
| AP geospatial location | LTE/UMTS modem | 22 | WLAN xcvr | Location coordinates and resolution (latitude/longitude/altitude) of AP |
| AP Civic Location | LTE/UMTS modem | 4-65540 | WLAN xcvr | Postal address of AP |
| AP Location Public Id. URI | LTE/UMTS modem | 4-65540 | WLAN xcvr | URI reference to where location information for the AP |
| Domain Name List | LTE/UMTS modem | 4-65540 | WLAN xcvr | Domain name(s) of the entity operating the network |
| Emergency Alert Id. URI | LTE/UMTS modem | 4-65540 | WLAN xcvr | URI for EAS message retrieval |
| Emergency NAI | LTE/UMTS modem | 4-65540 | WLAN xcvr | Identity string used for emergency access requests |
| ANQP Vendor-Specific list | LTE/UMTS modem | 4-65540 | WLAN xcvr | Vendor-Specific information not defined in standard |
| Venue info | LTE/UMTS modem | 2 | WLAN xcvr | Group and Type of venue where the AP is located |
| Extended Capabilities info. | LTE/UMTS modem | variable | WLAN xcvr | Bitmap identifying features supported by AP |

The interoperability between the mobile communication device (UE) and wireless networks 200 and 202 can be described in conjunction with the following further example. Consider again the case where wireless transceiver 300 and wireless network 200 operate in accordance with 802.11u or 802.11uc and wireless transceiver 304 and wireless network 202 operate in accordance with 3GPP via UMTS/LTE. In this particular case, a 3GPP call is offloaded onto a WLAN operated by the operator of the 3GPP network.

The UE is connected to network 202 via UMTS/LTE. The wireless network 202 and the wireless transceiver 304 (LTE/UMTS modem) support Release 12 RRC signaling or SIB broadcast for WLAN interworking. The wireless network 202 prepares WLAN offloading. In particular, the wireless network 202 knows the location of the UE (Cell ID) and the location of its own APs. The wireless network 202 sends ANQP information to the UE through LTE or UMTS modem. The LTE/UMTS modem initiates contact with the wireless transceiver 300 via the transceiver interface 302. The LTE/UMTS modem uses the transceiver interface 302 to send all received ANQP information to the wireless transceiver 300 (WLAN transceiver). The LTE/UMTS modem need not use the host processing module 360 of the phone for this exchange—which can reduce power consumption. Each time the LTE/UMTS modem receives updated ANQP information from the 3GPP network (wireless network 202), it sends this information to the WLAN transceiver. If the WLAN transceiver requires any ANQP information, it will use the transceiver interface 302 to require LTE/UMTS modem to assist him and query the wireless network 202 for the ANQP information. When the LTE/UMTS modem receives the ANQP information and the AP information, it can directly connect to the AP, as selected by the wireless transceiver 300 or required by the operator of wireless network 200 and 202.

Figure 4:
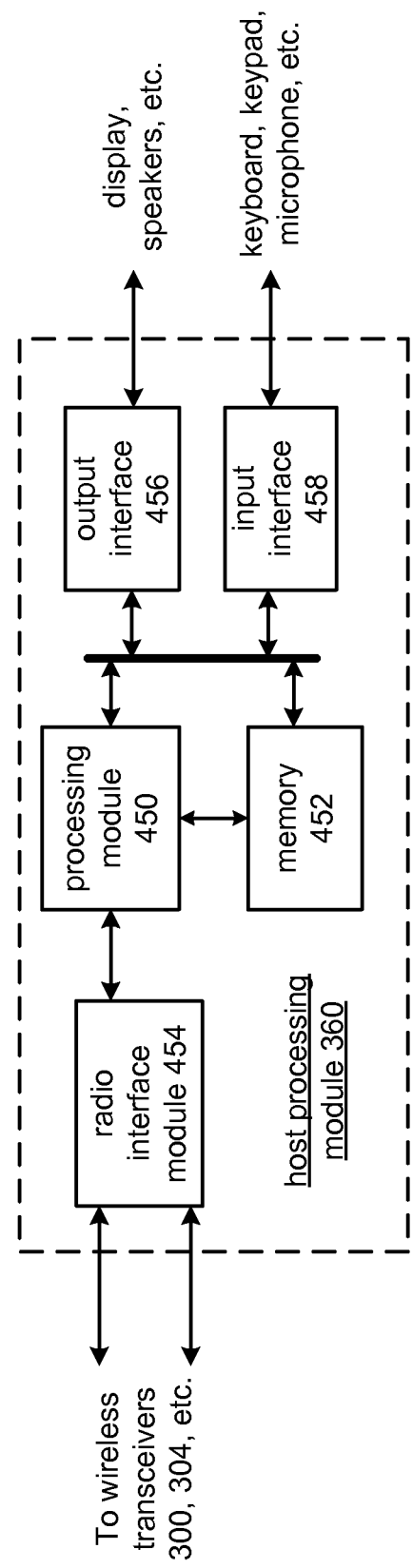
FIG. 4 is a diagram illustrating an embodiment of a host processing module 360.

FIG. 4 is a diagram illustrating an embodiment of a host processing module 360. As illustrated, the host processing device 360 includes a processing module 450, memory 452, radio interface 454, input interface 458 and output interface 456. The processing module 450 and memory 452 execute the corresponding instructions that are typically done by the host device. For example, for a cellular telephone host device, the processing module 450 performs the corresponding communication functions corresponding to the wireless transceivers 300 and 304 as well as other functions of the devices.

The radio interface module 454 allows data to be received from and sent to two or more wireless transceivers 300, 304, etc. For inbound data, the radio interface module 454 provides the data to the processing module 450 for further processing and/or routing to the output interface 456. The output interface 456 provides connectivity to an output display device such as a display, monitor, speakers, etc. such that the received data may be displayed. The radio interface 454 also provides data from the processing module 450 to the wireless transceivers 300, 304, etc. The processing module 450 may receive the outbound data from an input device such as a keyboard, keypad, microphone, etc. via the input interface 458 or generate the data itself. For data received via the input interface 458, the processing module 450 may perform a corresponding host function on the data and/or route it to one of the wireless transceivers 300, 304 via the radio interface module 454.

Figure 5:
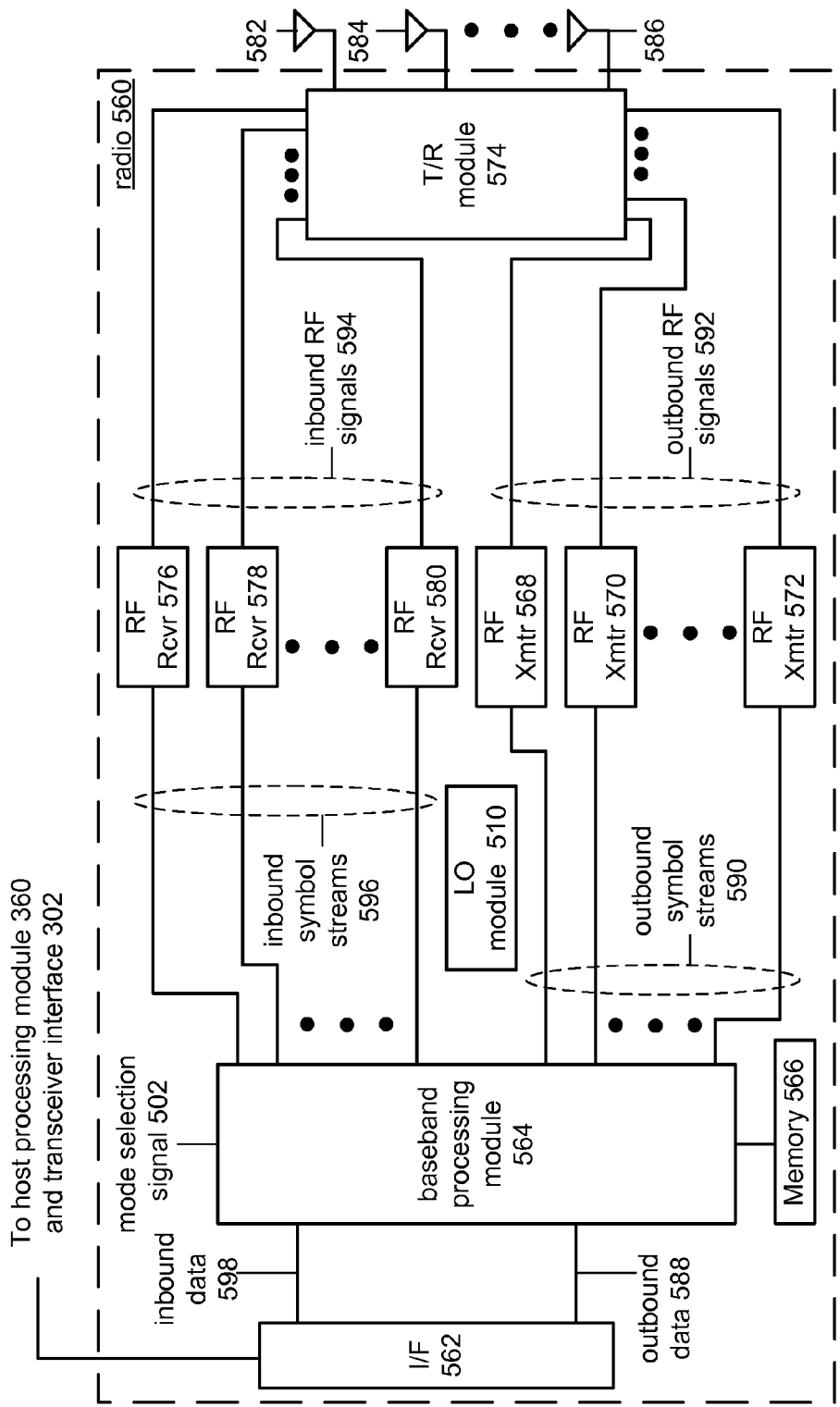
FIG. 5 is a diagram illustrating an embodiment of a radio 560.

FIG. 5 is a diagram illustrating an embodiment of a radio 560. In particular, radio 560 presents an example of wireless transceiver 300 and/or 304 that includes multiple antennas for optional MIMO operation. Radio 560 includes an interface 562, a baseband processing module 564, memory 566, a plurality of radio frequency (RF) transmitters 568-572, a transmit/receive (T/R) module 574, a plurality of antennas 582-586, a plurality of RF receivers 576-580, and a local oscillation module 510. The baseband processing module 564, in combination with operational instructions stored in memory 566, execute digital receiver functions and digital transmitter functions, respectively. In operation, the radio 560 receives outbound data 588 and control information from either the host device or transceiver interface 302 via the interface 562. The baseband processing module 564 receives the outbound data 588 and, based on a mode selection signal 502, produces one or more outbound symbol streams 590.

The baseband processing module 564, based on the mode selection signal 502 produces the one or more outbound symbol streams 590 from the output data 588. For example, if the mode selection signal 502 indicates that a single transmit antenna is being utilized for the particular mode that has been selected, the baseband processing module 564 will produce a single outbound symbol stream 590. Alternatively, if the mode select signal indicates 2, 3 or 4 antennas, the baseband processing module 564 will produce 2, 3 or 4 outbound symbol streams 590 corresponding to the number of antennas from the output data 588.

Depending on the number of outbound streams 590 produced by the baseband module 564, a corresponding number of the RF transmitters 568-572 will be enabled to convert the outbound symbol streams 590 into outbound RF signals 592. The transmit/receive module 574 receives the outbound RF signals 592 and provides each outbound RF signal to a corresponding antenna 582-586.

When the radio 560 is in the receive mode, the transmit/receive module 574 receives one or more inbound RF signals via the antennas 582-586. The T/R module 574 provides the inbound RF signals 594 to one or more RF receivers 576-580. The RF receiver 576-580 converts the inbound RF signals 594 into a corresponding number of inbound symbol streams 596. The number of inbound symbol streams 596 will correspond to the particular mode in which the data was received. The baseband processing module 564 receives the inbound symbol streams 590 and converts them into inbound data 598, which is provided to the host device via the host interface 562 of the a companion transceiver via transceiver interface 302.

Figure 6:
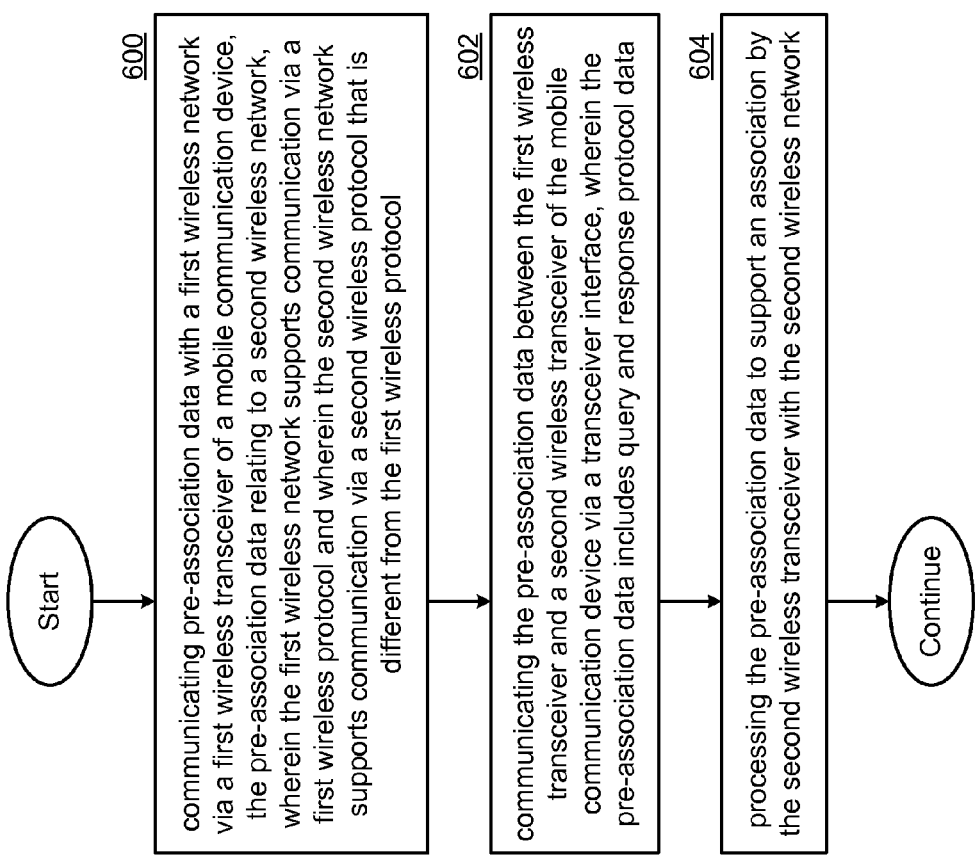
FIG. 6 is a flow diagram illustrating an embodiment of method.

FIG. 6 is a flow diagram illustrating an embodiment of method. In particular, a method is presented for use in conjunction with one or more functions and features described in conjunction with FIGS. 1-5. Step 600 includes communicating pre-association data with a first wireless network via a first wireless transceiver of a mobile communication device, the pre-association data relating to a second wireless network, wherein the first wireless network supports communication via a first wireless protocol and wherein the second wireless network supports communication via a second wireless protocol that is different from the first wireless protocol. Step 602 includes communicating the pre-association data between the first wireless transceiver and a second wireless transceiver of the mobile communication device via a transceiver interface, wherein the pre-association data includes query and response protocol data. Step 604 includes processing the pre-association data to support an association by the second wireless transceiver with the second wireless network.

In an embodiment, the first wireless network supports voice and data communications and the second wireless network is a local area network. The pre-association data includes metadata associated with the second wireless network, features associated with the second wireless network, and/or services available via the second wireless network.

The pre-association data can be processed to support an association by the second wireless transceiver with the second wireless network, prior to the second wireless transceiver communicating with the second wireless network. The second wireless network can communicate the pre-association data via the first wireless network. The transceiver interface can further communicate co-existence data between the first wireless transceiver and the second wireless transceiver to control interference between the first wireless transceiver and the second wireless transceiver.

Figure 7:
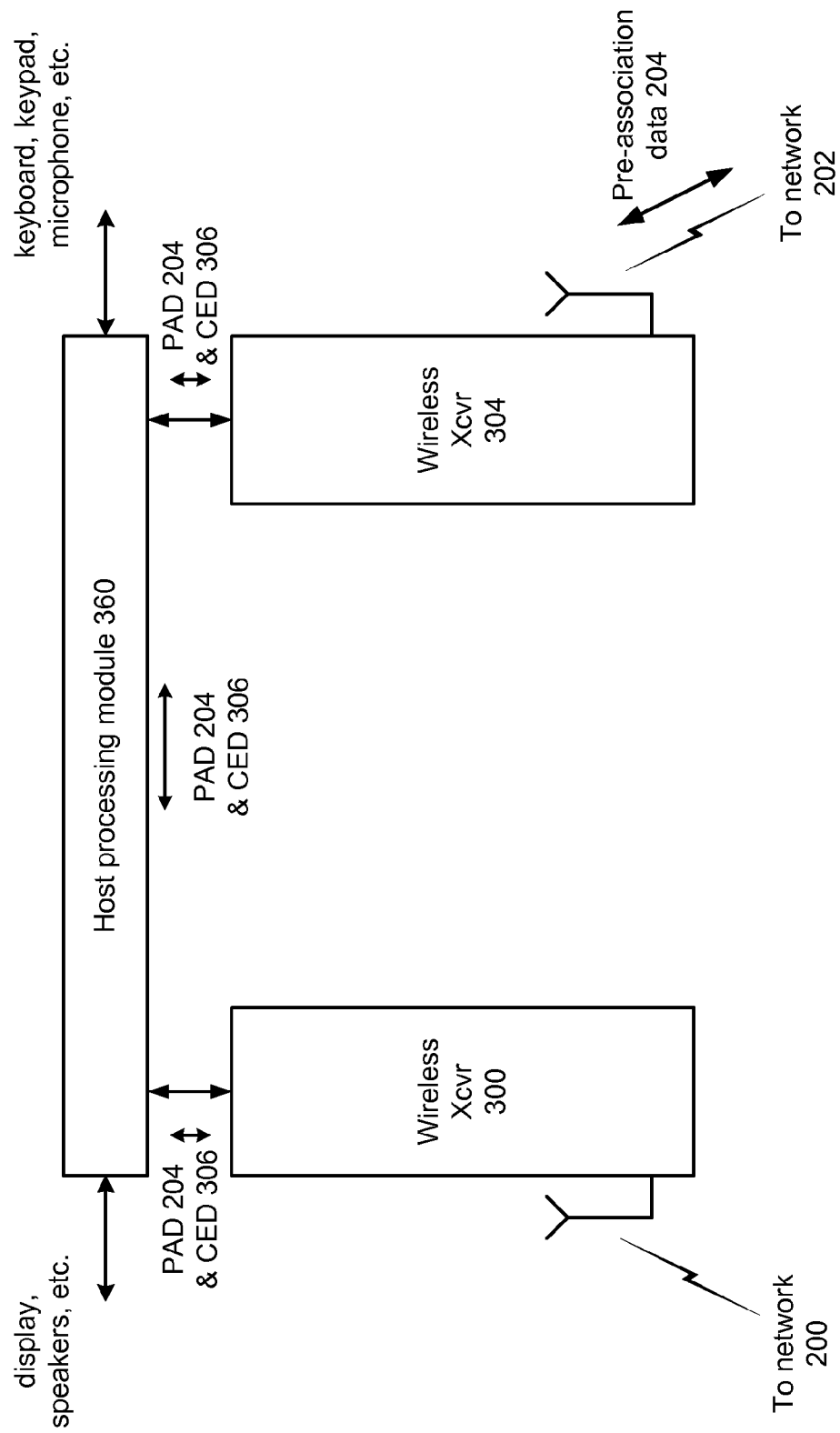
FIG. 7 is a diagram illustrating an embodiment of components of a wireless communication device.

FIG. 7 is a diagram illustrating an embodiment of components of a wireless communication device. In particular, a wireless communication device is presented that includes many similar elements described in conjunction with FIG. 3 that are referred to by common reference numerals. In this embodiment, however, the transceiver interface 302 is optionally included to share co-existence data 306 between the wireless transceivers 300 and 304. The pre-association data 204 is shared between wireless transceivers 300 and 304 via the host processing module 360. In particular, the radio interface module 454 and/or processing module 450 provide a bridge between the wireless transceiver 300 and wireless transceiver 304 to provide interworking or otherwise share pre-association data 204 between wireless transceivers 300 and 304.

In an embodiment, the wireless transceiver 300 includes a Bluetooth/WLAN combined transceiver and wireless transceiver 304 includes an MWS (mobile wireless standard) device or other 3GPP device such as a (LTE/UMTS modem). The host processing module 360 provides a HCI (host controller interface) compliant with the BT-SIG standard that allows the LTE/UMTS modem and BT/WLAN transceiver to exchange information including pre-association data 204 and optionally coexistence data 306 to support cooperative coexistence. In particular, MWS Coexistence logical signaling defines a set of signals between the collocated BT/WLAN transceiver (operating as a Bluetooth Controller) and the MWS device. Those signals carry time critical information such as the start point of an MWS frame. The coexistence logical signaling architecture also includes a transparent data messaging mechanism to enable passing of information between the MWS device and Bluetooth Controller when such information cannot tolerate the long latency (tens of milliseconds). In-device coexistence signaling can be provided through a BT-SIG WCI-2 standardized interface that supports coexistence between LTE/UMTS and BT/WLAN transceivers.

In addition to providing co-existence support, the HCI BT-SIG WCI-2 interface bridging provided by the host processing module 360 can be extended to support 3GPP-WLAN RAN interworking and especially to provide WLAN ANQP information from the LTE/UMTS modem of wireless transceiver 304 to the BT/WLAN portion of wireless transceiver 300. This information can be received through RRC (radio resource control) layer of the LTE/UMTS modem. In particular, this extend BT-SIG WCI-2 interface provided by host processing module 360 allows the wireless transceiver 300 to query ANQP parameters via the wireless transceiver 304.

Figure 8:
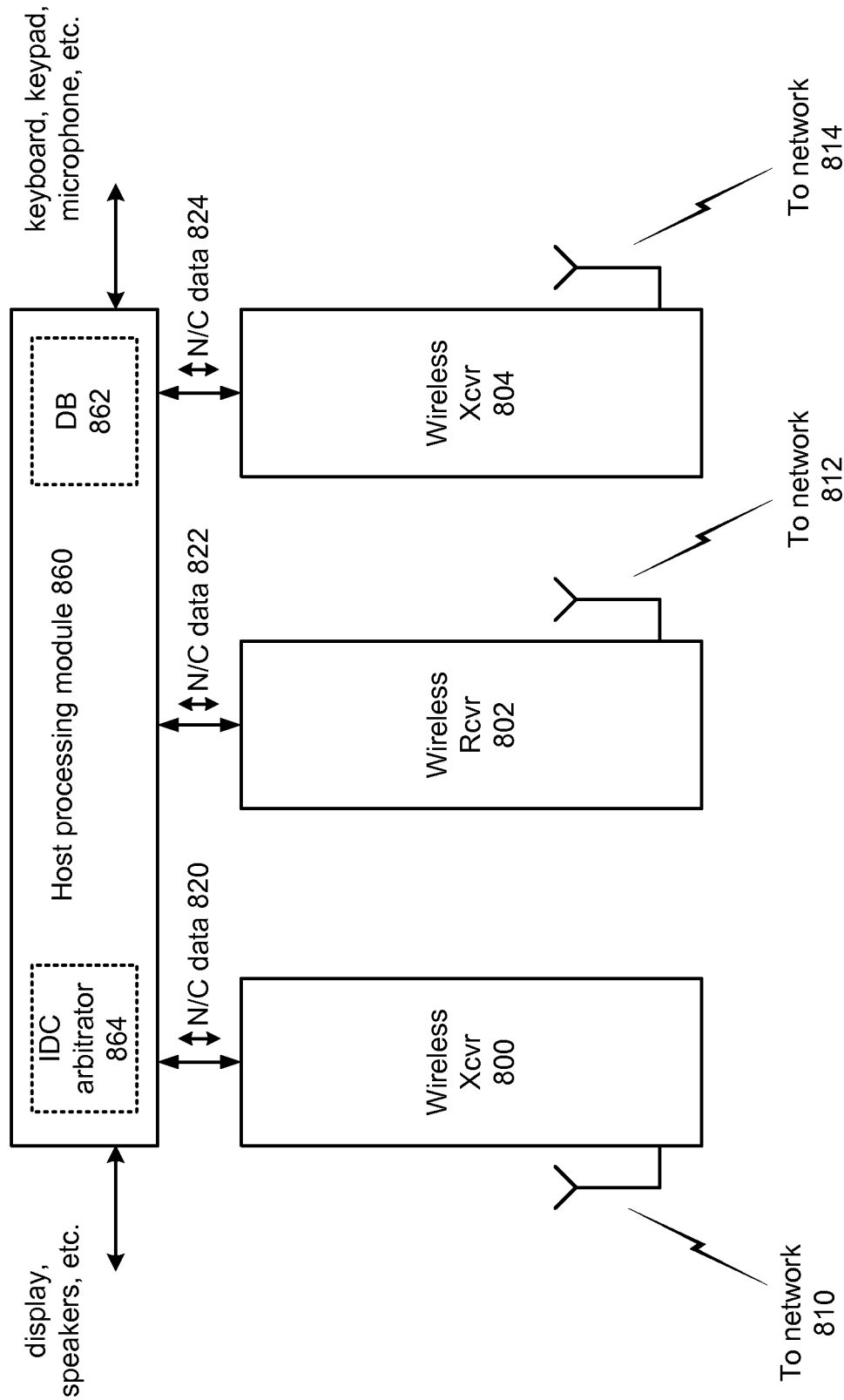
FIG. 8 is a diagram illustrating an embodiment of components of a wireless communication device.

FIG. 8 is a diagram illustrating an embodiment of components of a wireless communication device. In particular, a wireless communication device is presented that includes many similar elements described in conjunction with FIG. 3 that are referred to by common reference numerals. In this embodiment however, a host processing module 860 operates in a similar fashion to host processing module 360, however, it shares network and control (N/C) data 820, 822 and 824 with wireless transceivers 800 and 804 and wireless receiver 802 and/or other collocated receivers, transmitters and transceivers. The wireless transceivers 800 and 804 and wireless receiver 802 can include a BT/WLAN transceiver, 3GPP transceiver such as an LTE/UMTS modem or other 3GPP transceiver, a GPS receiver and/or other wireless transceiver or receiver. Similarly, the networks 810, 812 and 814 can include a Bluetooth, network, WLAN network, 3GPP network, and/or other wireless networks. Further examples include transceivers and corresponding networks that operate in accordance with advanced mobile phone services (AMPS), digital AMPS, global system for mobile communications (GSM), code division multiple access (CDMA), local multipoint distribution systems (LMDS), multi-channel-multipoint distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof), ZigBee, and NFC (near field communications).

In operation, the host processing module 860 gathers network data from the wireless transceivers 800 and 804 and/or wireless receiver 802 and creates a database of channel information relating to channels, frequencies, frequency bands and other spectral information. For example, the network information can include information on noise and interference, channel usage by the collocated transceivers and receivers, user preferences, operator preferences along with timing and/or other spectral information generated in the form of reports that are generated by the wireless transceivers 800 and 804 and wireless receiver 802 and/or other collocated receivers, transmitters and transceivers and shared with the host processing module 860 via network control data 820, 822, 824, . . . . This network and control data 820, 822, 824 can be stored in a database 862.

The host processing module 860 further includes an IDC (intra-device coexistence) arbitrator 864 that determines an IDC methodology and controls coexistence via commands sent to the wireless transceivers 800 and 804 and/or wireless receiver 802 via the network and control data 820, 822 and 824. The IDC arbitrator 864 retrieved network and control data 820, 822 and/or 824 from the database 862 and analyzes this data to rank different possible IDC schemes in a rank ordering—in order or preference or likelihood of success, etc.

An embodiment of the operation of the IDC arbitrator 864 can be described in conjunction with the example that follows. Consider the case where the wireless transceiver 800 is a BT/WLAN transceiver, wireless receiver 802 is a GPS receiver and wireless transceiver 804 is a LTE/UMTS modem. These collocated RF technologies suffer from interference to each other, causing service interrupt or degraded link or packet-level performance due to physical proximity, spectral closeness, imperfection of RF filtering that drifts with temperature, and RF harmonics or intermediate modulations. Even the simultaneous transmission and reception by the same RF technology over same or different carriers, such as LTE Carrier Aggregation and LTE/3G data-plus-2G voice, may see similar problem. Further, WLAN, GPS and BT (ISM) can both operate at 2.4 GHz ISM band, which can't be resolved by purely RF-level filtering for a single-die WLAN-BT combo chip.

In accordance with this example, the IDC arbitrator 864 collects and stores information received from the wireless transceiver 800 and 804 and the wireless receiver 802 in the database 862. This information can include network data regarding LTE serving cells and authorized neighbors cells, WLAN available frequencies and user/operators preferences such as LTE band, frequencies, RSSI (receive signal strength indication), RSRP (reference signal received power), RSRQ (reference signal received quality), user preferences, BT/WIFI frequencies, signal levels and GPS frequencies.

IDC Arbitrator 864 analyzes the information from the database 862 and optionally makes a decision to trigger a specific IDC procedure in one or more specific technology—and sends command data via network and control data 820, 822 and/or 824 to control the appropriate changes in the wireless transceivers 800 and 804 and/or the wireless receiver 802. These different schemes, for example, include but are not limited to:

Move the LTE signal away from the BT/WLAN frequencies by performing inter-frequency handover within E-UTRAN (LTE).

Have the UE request the network to perform time domain scheduling to reserve some time for BT/WLAN/GPS activities, critical or otherwise.

Have the UE to autonomously decide to use some times for BT/WLAN/GPS activities and deny any LTE activity during this time.

Change WLAN channels if channels are available.

Deny BT/WLAN transmissions during certain times.

Etc.

Figure 9:
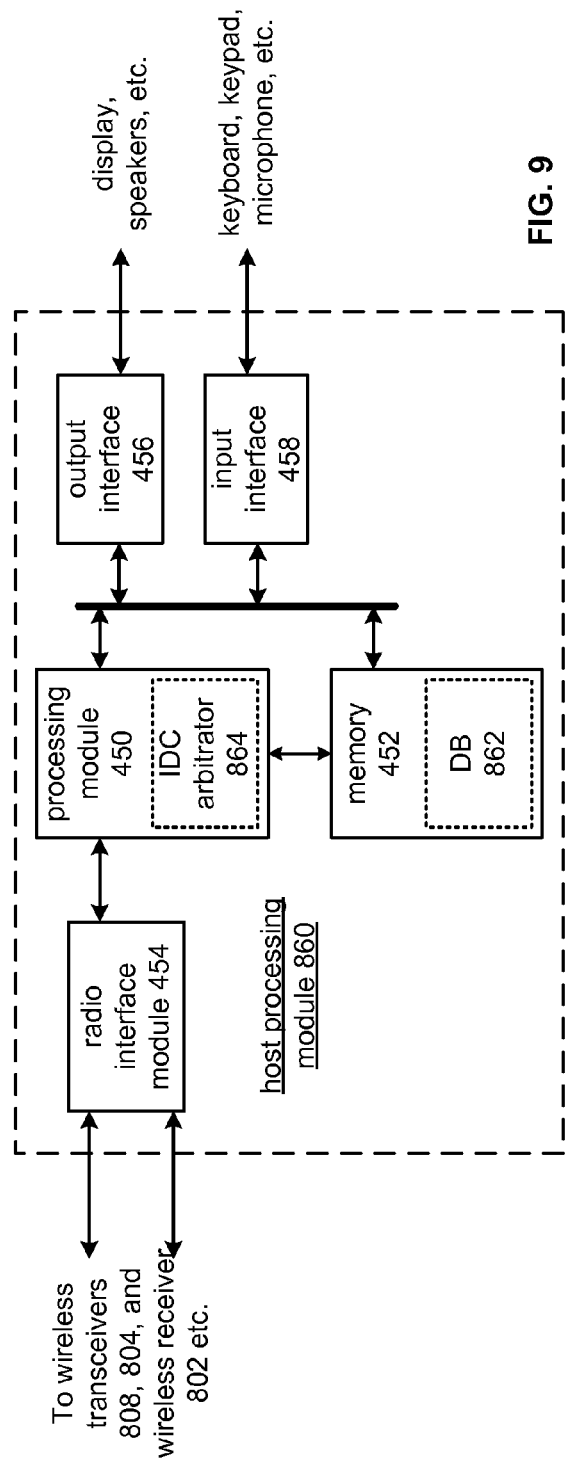
FIG. 9 is a diagram illustrating an embodiment of a host processing module 360.

FIG. 9 is a diagram illustrating an embodiment of a host processing module 860. In particular, a host processing module 860 is presented that includes many similar elements to the host processing module 360 that are referred to by common reference numerals. As shown, the IDC arbitrator is implemented via processing module 450 and the database 862 is implemented via memory 452. It should be noted that, which shown as being incorporated in other elements, the IDC arbitrator 864 and database 862 can, in the alternative, be implemented via dedicated hardware such as a dedicated processing device and dedicated memory device.

As discussed in conjunction with FIG. 8, the IDC arbitrator 864 collects and stores information received from the wireless transceiver 808 and 804 and the wireless receiver 802 in the database 862. IDC Arbitrator 864 analyzes the information from the database 862 and optionally makes a decision to trigger a specific IDC procedure in one or more specific technology—and sends command data via network and control data 820, 822 and/or 824 to control the appropriate changes in the wireless transceivers 800 and 804 and/or the wireless receiver 802.

Figure 10:
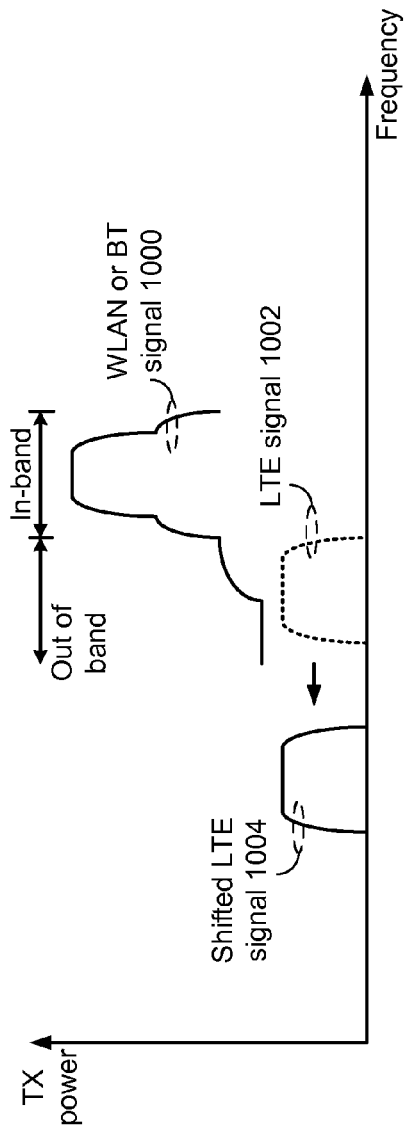
FIG. 10 is a diagram illustrating an embodiment of a frequency spectrum.

FIG. 10 is a diagram illustrating an embodiment of a frequency spectrum. The spectral diagram illustrates a diagram of frequency versus power for a wireless communication device, such as any of the wireless communication devices 18-32. A particular portion of a frequency spectrum is illustrated to accentuate certain principles and is not drawn to scale. In particular, this diagram follows through with the example presented in conjunction with FIG. 8 where the wireless transceivers 800 and 804 include a BT/WLAN transceiver and 3GPP transceiver such as an LTE/UMTS modem.

In this example, a BT/WLAN signal 1000 includes both in-band and out of band signal components. In particular, out of band components, caused by, for example, bandpass filter roll-off or insufficient antenna isolation could potentially interfere with the LTE signal 1002. The IDC arbitrator detects this condition and locates the availability of neighboring LTE frequencies and controls the handoff as shown by shifted LTE signal 1004.

Figure 11:
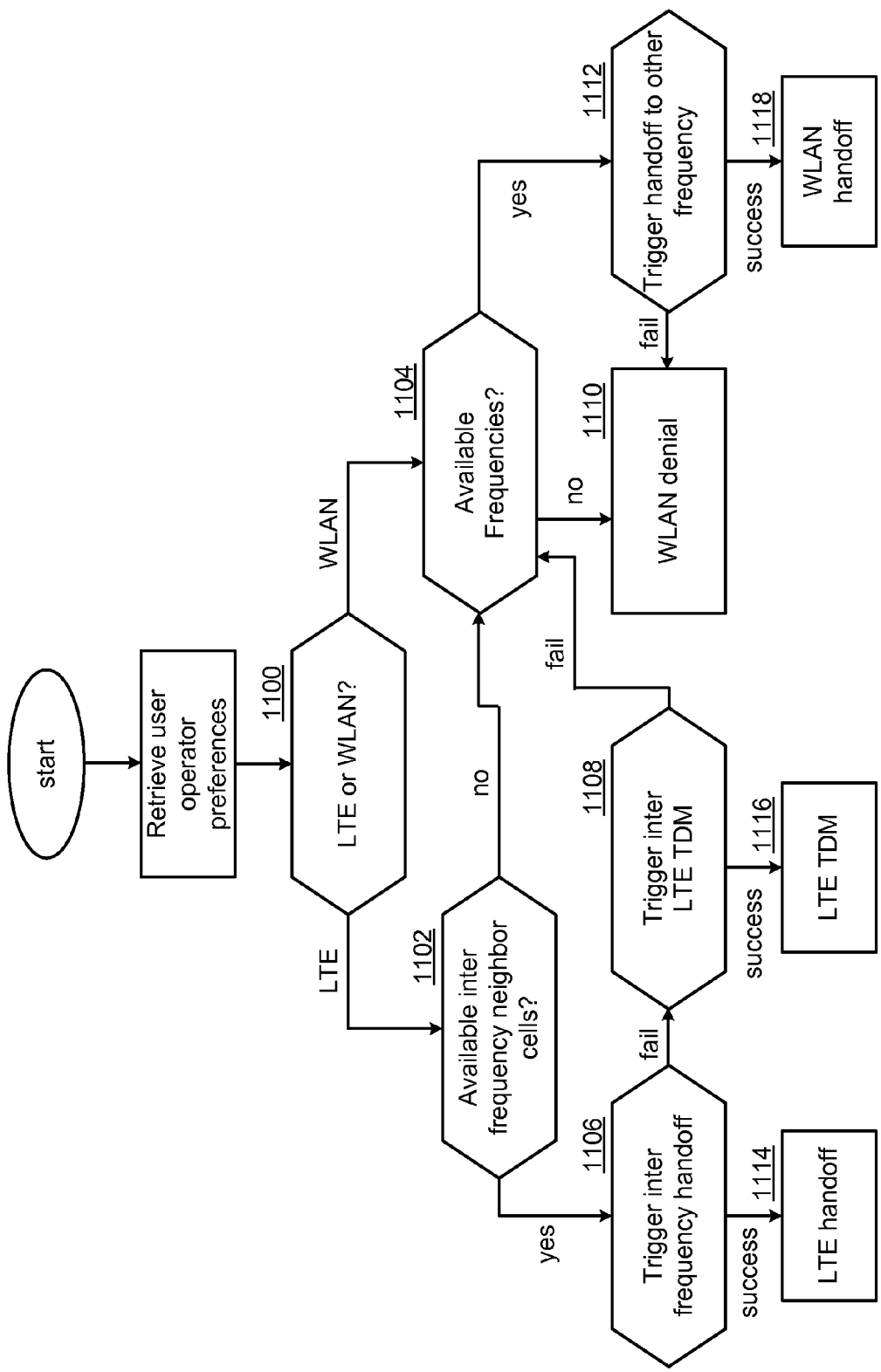
FIG. 11 is a flow diagram illustrating an embodiment of method.

FIG. 11 is a flow diagram illustrating an embodiment of method. In particular, a method is presented for use in conjunction with one or more functions and features described in conjunction with FIGS. 1-10. In particular, this method follows through with the example presented in conjunction with FIG. 8 where the wireless transceivers 800 and 804 include a BT/WLAN transceiver and 3GPP transceiver such as an LTE/ UMTS modem and further where a potential conflict is detected between the two modes of operation. The method is suitable for use by the IDC arbitrator 864 to determine how to select an IDC scheme such as either LTE handoff to a new frequency, LTE TDM, WLAN handoff to a new frequency or simple WLAN denial of service.

In step 1100, the IDC arbitrator 864 retrieves user operator preferences and/or other network and control data 820 and 824 from the database 862. The method determines whether LTE or WLAN IDC solutions should be selected, based on user preferences, operator preferences or other data as shown in step 1100. When LTE is selected, the method proceeds to step 1102 where the IDC arbitrator 864 determines if there are available inter frequency neighbor cells. If not, the method proceeds to step 1104. If so, the method proceeds to step 1106 where the IDC arbitrator 864 attempt to trigger an inter frequency handoff to the neighbor cell or cells. If this succeeds, the LTE handoff is used as shown in step 1114. If the handoff fails, the method proceeds to step 1108 where the IDC arbitrator 864 triggers an LTE TDM (time division multiplexing). If this is successful, the LTE TDM is used as shown in step 1116. If not, the method proceeds to step 1104.

In step 1104, the IDC arbitrator 864 focuses on WLAN IDC solutions and checks for available frequencies. If none are available, the method proceeds to step 1110, where WLAN is denied. If frequencies are available the method proceeds to step 1112 where the IDC arbitrator 864 triggers handoff to other frequencies. If this fails, WLAN operation is denied as shown in step 1110. If this handoff is successful, the method proceeds with the WLAN handoff as shown in step 1118.

It should be noted that the example described above and other methodologies can be applied to additional IDC schemes, additional radio technologies and different decision criteria, in various other embodiments.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A mobile communication device, comprising:
   a first wireless transceiver configured to receive pre-association data from a first wireless network, the pre-association data relating to a second wireless network, wherein the first wireless network supports communication via a first wireless protocol and wherein the second wireless network supports communication via a second wireless protocol that is different the first wireless protocol; and
   a second wireless transceiver configured to receive the pre-association data from the first wireless transceiver via a transceiver interface and further configured to process the pre-association data to support an association by the second wireless transceiver with the second wireless network;
   wherein co-existence data is communicated between the first wireless transceiver and the second wireless transceiver via the transceiver interface to control interference between the first wireless transceiver and the second wireless transceiver.

2. The mobile communication device of claim 1, wherein the second wireless network is a local area network.

3. The mobile communication device of claim 2, wherein the pre-association data includes query and response protocol data.

4. The mobile communication device of claim 2, wherein the pre-association data includes metadata associated with the second wireless network.

5. The mobile communication device of claim 2, wherein the pre-association data includes features associated with the second wireless network.

6. The mobile communication device of claim 1, wherein the second wireless transceiver processes the pre-association data to support the association by the second wireless transceiver with the second wireless network, prior to the second wireless transceiver communicating with the second wireless network.

7. The mobile communication device of claim 1, wherein the second wireless network receives the pre-association data via the first wireless network.

8. The mobile communication device of claim 1, wherein the first wireless network supports voice and data communications.

9. A method comprising:
   communicating pre-association data with a first wireless network via a first wireless transceiver of a mobile communication device, the pre-association data relating to a second wireless network, wherein the first wireless network supports communication via a first wireless protocol and wherein the second wireless network supports communication via a second wireless protocol that is different from the first wireless protocol;
   communicating the pre-association data between the first wireless transceiver and a second wireless transceiver of the mobile communication device via a transceiver interface;
   processing the pre-association data to support an association by the second wireless transceiver with the second wireless network; and
   controlling interference between the first wireless transceiver and the second wireless transceiver via co-existence data communicated between the first wireless transceiver and the second wireless transceiver via the transceiver interface.

10. The method of claim 9, wherein the second wireless network is a local area network.

11. The method of claim 9, wherein the pre-association data includes metadata associated with the second wireless network.

12. The method of claim 9, wherein the pre-association data includes at least one of: features associated with the second wireless network, and services available via the second wireless network.

13. The method of claim 9, wherein the pre-association data is processed to support an association by the second wireless transceiver with the second wireless network, prior to the second wireless transceiver communicating with the second wireless network.

14. The method of claim 9, wherein the second wireless network communicates the pre-association data via the first wireless network.

15. The method of claim 9, wherein the first wireless network supports voice and data communications.

16. A mobile communication device, comprising:
 a first wireless transceiver configured to receive pre-association data via a first wireless network, the pre-association data relating to a second wireless network, wherein the first wireless network supports communication via a first wireless protocol, wherein the second wireless network supports communication via a second wireless protocol that is different from the first wireless protocol, wherein the second wireless network is a local area network; and
 a second wireless transceiver configured to receive the pre-association data from the first wireless transceiver via a transceiver interface and further configured to process the pre-association data to support an association by the second wireless transceiver with the second wireless network, prior to the second wireless transceiver communicating with the second wireless network;
 wherein co-existence data is communicated between the first wireless transceiver and the second wireless transceiver via the transceiver interface to control interference between the first wireless transceiver and the second wireless transceiver.

17. The mobile communication device of claim 16, wherein the second wireless network communicates the pre-association data via the first wireless network.

18. The mobile communication device of claim 16, wherein the first wireless network supports voice and data communications.

19. The mobile communication device of claim 16, wherein the first wireless transceiver supports multi-input, multi-output (MIMO) communications via a plurality of antennas.

20. The mobile communication device of claim 19, wherein the second wireless transceiver supports multi-input, multi-output (MIMO) communications via the plurality of antennas.

* * * * *